United States Patent [19]
Crovetti

[11] 3,855,253
[45] Dec. 17, 1974

[54] 4'-[(DIIODOMETHYL)SULFONYL]ACETANILIDE

[75] Inventor: Aldo Joseph Crovetti, Lake Forest, Ill.

[73] Assignee: Abbott Laboratories, North Chicago, Ill.

[22] Filed: Aug. 7, 1973

[21] Appl. No.: 386,233

Related U.S. Application Data

[60] Continuation of Ser. No. 215,949, Dec. 16, 1971, abandoned, which is a division of Ser. No. 805,846, March 10, 1969, Pat. No. 3,632,859.

[52] U.S. Cl. ............................................. 260/397.6
[51] Int. Cl. .......................................... C07c 147/00
[58] Field of Search ................................. 260/397.6

[56] References Cited
FOREIGN PATENTS OR APPLICATIONS
2,011,052   11/1970   Germany ........................ 260/397.6

Primary Examiner—Henry R. Jiles
Assistant Examiner—S. D. Winters
Attorney, Agent, or Firm—Robert L. Niblack; Joyce R. Krei

[57] ABSTRACT

Diiodomethylsulfones of the formula

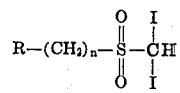

wherein $n$ is an integer from zero to four and R is anilamido.

1 Claim, No Drawings

4'[(DIIODOMETHYL)SULFONYL] ACETANILIDE

CROSS-REFERENCE TO RELATED APPLICATION

This application is a continuation of U.S. Ser. No. 215,949, filed Dec. 16, 1971, and now abandoned, which is a division of U.S. Ser. No. 805,846, filed Mar. 10, 1969, and now U.S. Pat. No. 3,632,859.

DETAILED DESCRIPTION OF THE INVENTION

This invention relates to novel substituted halomethyl sulfones and particularly to compounds wherein the substituents are higher alkyl, aryl and substituted aryl groups. The compounds are useful as fungicides.

Fungi are plants comprising molds, mildews, rusts, smuts and mushrooms and range in size from microscopic cells such as yeasts to highly organized fruiting bodies. While some fungi such as mushrooms are useful, many of them produce undesirable decay and destruction of paper, wood, textiles, grains and the like. Because fungi are found in association with such a large variety of host materials which differ sharply in their resistance to fungicides, there is a continuing need for diverse types of agents for fungus control.

It is an object of this invention therefore to provide compounds which are highly effective in the control of fungus particularly cellulose consuming mildew. It is a further object of this invention to provide, as fungicides, higher alkyl halomethyl sulfones, aryl and substituted aryl halomethyl sulfones.

These and other objects which will be apparent from the following description are attained through the provision of a compound of the formula

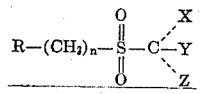

wherein R is selected from the group consisting of higher alkyl, cycloalkyl, t-butylphenyl, anilino, anilamido, loweralkoxyphenyl, naphthyl, nitrophenyl, halonitrophenyl, nitroloweralkylphenyl, polyloweralkylphenyl haloloweralkylphenyl, and halophenyl wherein the halogen is selected from the group consisting of fluorine, bromine and iodine, and $n$ is an integer from 0 to 4, when X, Y and Z have a total molecular weight greater than 110 and are selected from the group consisting of hydrogen and halogen; and wherein R is selected from the group consisting of chlorophenyl and polychlorophenyl when X, Y and Z have a total molecular weight greater than 250 and are selected from the group consisting of hydrogen and halogen.

The term "loweralkyl" as used in the present specification and claims designates a straight chain or branched chain alkyl group containing 1 to 4 carbon atoms; the term "higher alkyl" designates an alkyl group of 10 to 20 carbon atoms.

The compounds of the present invention are prepared by halogenating the R-sulfonyl acetic acids or their esters. Two schemes for preparation of the acids are presented below and illustrate reaction sequences and intermediate compounds where R=methoxyphenyl. Sulfonyl acetic acids with other R substituents may be prepared similarly.

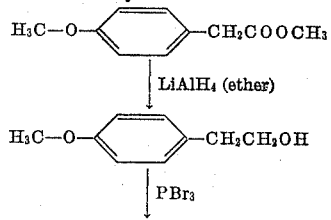

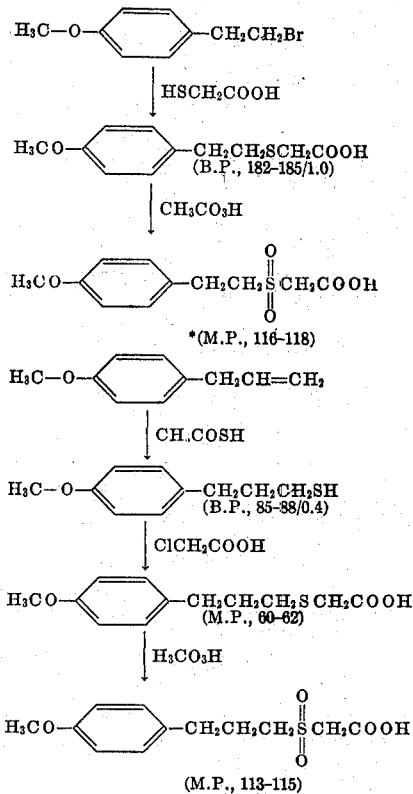

\* Melting points in degrees C.

The R-sulfonyl acetic acids or their esters are halogenated with sodium hypohalite in an alkaline aqueous solution followed by decarboxylation. The reaction may be represented as follows:

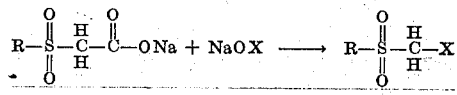

wherein X represents the halogen. The di- and trihalomethyl compounds may be similarly prepared by employing larger proportions of the halogenating reagent. In an alternative procedure, the aryl thioacetic acids may be halogenated with sodium hypohalite according to the following scheme in which oxidation of the sulfur to a sulfonyl group occurs in addition to the halogenation and decarboxylation indicated above:

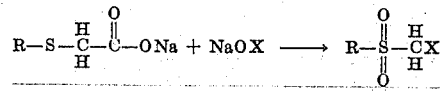

Many of these compounds are active against mildew, *Chaetomium globosum* at concentrations of 10 ppm, the lowest concentration at which they were tested; others were less active and up to 1,000 ppm were required. Larger concentrations may of course be used if the economics of the application permit.

The activity of the compounds against fungus appears to be directly related to the total molecular weight of the halogen atoms on the methyl sulfone group. Thus, the greatest activity is exhibited by the iodomethyl sulfones and they are a preferred embodiment of this invention.

Fungicidal activity also appears to be enhanced when the value of the integer $n$ was larger than 0 and in a preferred embodiment $n$ is equal from 1 to 3.

The following examples will illustrate the preparation of the compounds of this invention but should not be regarded as limiting.

EXAMPLE I p-BROMOPHENYL-DIBROMOMETHYL SULFONE p-Bromophenyl dibromomethyl sulfone was prepared by dissolving 19.5 (0.07 mole) of p-bromophenylsulfonyl acetic acid in 320 ml of 5% aqueous sodium hydroxide solution which was chilled to less than 10° as 21.3 g (0.133 mole) bromine was slowly added. When addition was complete, the mixture was stirred in the cold another two hours and at room temperature overnight. The solid was filtered and air-dried to yield 26.7 g of p-bromophenyl-di-bromomethyl sulfone melting at 118°–121° C. It could be crystallized from dilute ethanol.

| | |
|---|---|
| Calculated for $C_7H_5Br_3O_2S$: | C=21.40%; H=1.28%; Br=61.02% |
| Found: | C=21.64%; H=1.23%; Br=60.94% |

EXAMPLE II p-BROMOPHENYL-TRIBROMOMETHYL SULFONE p-Bromophenyl-tribromomethyl sulfone was prepared according to the procedure of Example I, but a proportionately larger quantity of bromine was used. The presence of the dibromomethyl and tribromomethyl moiety of the compound of Examples I and II was confirmed with NMR spectra.

EXAMPLE III p-METHOXYPHENYL DIIODOMETHYL SULFONE p-Methoxyphenyl diiodomethyl sulfone was prepared by dissolving 11.5g (0.05 mole) of p-methoxyphenylsulfonyl acetic acid in 40 ml of 5% aqueous sodium hydroxide (0.05 mole). A solution of sodium hypoiodite was prepared by adding iodine monochloride, 19.5 g (0.12 mole) to 200 ml 5% sodium hydroxide solution. The hypoiodite was added to the stirred sulfonyl acetic acid solution at room temperature and after the addition was completed, this mixture was stirred for 2 hours. It was then acidified with 22 ml concentrated HCl solution and stirred another two hours at room temperature while carbon dioxide evolved. The mixture was made alkaline with 50% sodium hydroxide solution and stirred for 15 minutes. The tan product was filtered off, washed with water, triturated with sodium bisulfite solution to remove color, filtered and washed again. The crude dried p-methoxyphenyl diiodomethyl sulfone weighed 18.5 g and was crystallized from acetone-water, melting point 132°–4°.

| | |
|---|---|
| Calculated for $C_8H_8I_2O_3S$: | 21.93%; H=1.84%; I=57.95% |
| Found: | C=21.85%; H=2.11%; I=57.97% |

Other compounds of this invention prepared according to like procedures are:

| Compound | M.P. |
|---|---|
| 4-(methyl amido)-phenyl-diiodomethyl sulfone | M.P. 214–216° C. |
| 4-aminophenyl diiodomethyl sulfone | M.P. 180–182° C. |
| 4-chlorophenyl diiodomethyl sulfone | M.P. 132–134° C. |
| 4-bromophenyl diiodomethyl sulfone | M.P. 132–133° C. |
| 2-methyl-4-chlorophenyl diiodomethyl sulfone | M.P. 110–111° C. |
| alphanaphthyl diiodomethyl sulfone | M.P. 138–141° C. |
| 2-methyl-4-bromophenyl diiodomethyl sulfone | M.P. 114–115° C. |
| 3-methyl-4-bromophenyl diiodomethyl sulfone | M.P. 136–139° C. |
| 2,4-dimethylphenyl diiodomethyl sulfone | M.P. 114–117° C. |
| 3,4-dichlorophenyl diiodomethyl sulfone | M.P. 144–146° C. |
| 4-chlorophenyl dibromomethyl sulfone | M.P. 112–116° C. |
| 4-methoxyphenyl dibromomethyl sulfone | M.P. 80–83° C. |
| 4-chlorophenyl tribromomethyl sulfone | M.P. 160–162° C. |
| 4-methoxyphenyl tribromomethyl sulfone | M.P. 134–137° C. |
| 2-methyl-4-t-butylphenyl diiodomethyl sulfone | M.P. 127–128° C. |
| 2-nitro-4-methylphenyl dibromomethyl sulfone | M.P. 153–154° C. |
| 2-nitro-4-methylphenyl tribromomethyl sulfone | M.P. 183–186° C. |
| 2-nitro-4-methylphenyl iodomethyl sulfone | M.P. 132–140° C. |
| 4-chlorobenzyl diiodomethyl sulfone | M.P. 138–141° C. |
| 2-nitro-4-chlorophenyl iodomethyl sulfone | M.P. 183–184° C. |
| 2-nitro-4-chlorophenyl tribromomethyl sulfone | M.P. 185° C. |
| 4-nitrophenyl diiodomethyl sulfone | M.P. 184–186° C. |
| 2-methyl-4-t-butylphenyl tribromomethyl sulfone | M.P. 137–138° C. |
| 2-nitro-4-chlorophenyl diiodomethyl sulfone | M.P. 160–162° C. |
| 4-nitrophenyl tribromomethyl sulfone | M.P. 197–199° C. |
| 4-chlorobenzyl iodomethyl sulfone | M.P. 219–220° C. |
| cyclohexyl diiodomethyl sulfone | M.P. 126–128° C. |
| n-octyl diiodomethyl sulfone | M.P. 72–74° C. |
| 4-fluorobenzyl diiodomethyl sulfone | M.P. 119–121° C. |
| 4-bromobenzyl diiodomethyl sulfone | M.P. 149–151° C. |
| 4-methoxybenzyl diiodomethyl sulfone | M.P. 168–170° C. |
| 3-chlorobenzyl diiodomethyl sulfone | M.P. 182–184° C. |
| 3,5-dimethyl diiodomethyl sulfone | M.P. 188–190° C. |
| 1-phenyl-2-(diiodomethylsulfonyl)ethane | M.P. 69–71° C. |
| 3-bromobenzyl diiodomethyl sulfone | M.P. 192–194° C. |
| 2-naphthylmethyl-diiodomethyl sulfone | M.P. 172–174° C. |
| 1-phenyl-3-(diiodomethylsulfonyl)propane | M.P. 68–70° C. |
| 3,4-dimethylbenzyl diiodomethyl sulfone | M.P. 175–184° C. |
| 2,2,4,4-tetramethylbutyl diiodomethyl sulfone | M.P. 101–103° C. |
| 4-fluoro-benzyl dibromomethyl sulfone | M.P. 115–117° C. |
| 3-chlorobenzyl dibromomethyl sulfone | M.P. 150–152° C. |
| 4-bromobenzyl dibromomethyl sulfone | M.P. 126–128° C. |
| 3,4-dichlorobenzyl dibromomethyl sulfone | M.P. 130–132° C. |
| 2,4-dichlorobenzyl dibromomethyl sulfone | M.P. 109–111° C. |
| 3-bromobenzyl dibromomethyl sulfone | M.P. 151–153° C. |
| 2-bromobenzyl dibromomethyl sulfone | M.P. 110–112° C. |
| 4-nitrobenzyl dibromomethyl sulfone | M.P. 151–153° C. |
| 4-methoxybenzyl dibromomethyl sulfone | M.P. 125–127° C. |
| 2,5-dimethylbenzyl dibromomethyl sulfone | M.P. 119–121° C. |
| 3,4-dimethylbenzyl dibromomethyl sulfone | M.P. 118–125° C. |
| 1-phenyl-2-(dibromomethylsulfonyl)ethane | (oil) |
| 1-phenyl-3-(dibromomethylsulfonyl)propane | M.P. 55–57° C. |
| cyclohexyldibromomethyl sulfone | M.P. 96–98° C. |
| n-decyldibromomethyl sulfone | M.P. 47–49° C. |
| n-hexadecyl dibromomethyl sulfone | M.P. 76–78° C. |
| n-decyl diiodomethyl sulfone | M.P. 71–79° C. |
| 2-chlorobenzyl dibromomethyl sulfone | M.P. 107–108° C. |

The following example will illustrate the antifungal properties of representative examples of the compounds of this invention. The characters R, n, and X, Y and Z correspond to those shown in Formula I.

EXAMPLE IV

In this example, a nutrient medium containing a predetermined concentration of the test compound was inoculated with the fungus, incubated and then read to determine the extent of growth of the fungus. The nutrient meduim employed was Saboraud's liquid medium with 1.5% agar added and was autoclaved for 15 minutes at 15 pounds pressure.

The inoculum, in this instance *Chaetomium globosum* ATCC 6025, slant grown at 28° C for 7 days on a starvation medium (4% dextrose, 1% yeast extract, and 1.5 grams agar per liter of water) was scraped and suspended in approximately 2 ml Saboraud's broth. The spore suspension was adjusted to equal the No. 1 McFarland's Standard Nephalometer tube using Saboraud's broth as a diluent.

The fungicidal compound was prepared by weighing 50 mg of material into a 0.25 ml of dimethylformamide and then diluted to 10 ml with water. An amount of fungicide solution sufficient to provide 1,000 ppm, 100 ppm and 10 ppm, respectively, was added to sterile petrie dishes and 10 ml of nutrient medium agar was added to each and mixed thoroughly. The inoculum was applied with a cotton swab and, after three days incubation at 28° C, the plates were read for growth or absence of growth of the fungus. The results are reported in Table I.

All of the compounds listed in Table I inhibit the growth of *C. globosum* at 1,000 ppm and that many of the compounds of this invention completely inhibit fungus growth at a concentration as low as 10 ppm, the lowest concentration tested.

Without additional examples, it is believed that one skilled in the art, from the foregoing description is enabled to use this invention to its fullest extent.

I claim:

1. A compound of the formula

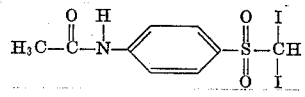

* * * * *